(12) United States Patent
Mukai et al.

(10) Patent No.: US 11,794,921 B2
(45) Date of Patent: Oct. 24, 2023

(54) AIRCRAFT LAMP

(71) Applicant: KOITO MANUFACTURING CO., LTD., Tokyo (JP)

(72) Inventors: Tomoyuki Mukai, Shizuoka (JP); Hiroto Shimizu, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 17/424,675

(22) PCT Filed: Jan. 22, 2020

(86) PCT No.: PCT/JP2020/002123
§ 371 (c)(1),
(2) Date: Jul. 21, 2021

(87) PCT Pub. No.: WO2020/153400
PCT Pub. Date: Jul. 30, 2020

(65) Prior Publication Data
US 2022/0106057 A1 Apr. 7, 2022

(30) Foreign Application Priority Data

Jan. 22, 2019 (JP) ................................. 2019-008122
Jan. 22, 2019 (JP) ................................. 2019-008123

(51) Int. Cl.
*B64D 47/02* (2006.01)
*B64D 41/00* (2006.01)
(Continued)

(52) U.S. Cl.
CPC ............. *B64D 47/02* (2013.01); *B64D 41/00* (2013.01); *F21V 5/04* (2013.01); *F21V 23/007* (2013.01)

(58) Field of Classification Search
CPC .. B64D 15/20; B64D 41/00; B64D 47/00–06; B64D 2203/00; F21V 5/00–10; F21V 23/007–008
See application file for complete search history.

(56) References Cited

U.S. PATENT DOCUMENTS 5,293,304 A * 3/1994 Godfrey ................. B64D 47/06
362/240
6,244,728 B1 6/2001 Cote et al.
(Continued)

FOREIGN PATENT DOCUMENTS

FR 3025588 A1 * 3/2016 ......... B64D 45/0059
GB 2553524 A 3/2018
(Continued)

OTHER PUBLICATIONS

International Search Report dated Mar. 17, 2020 issued by the International Searching Authority in counterpart International Application No. PCT/JP2020/002123 (PCT/ISA/210), English Translation.
(Continued)

*Primary Examiner* — Jason M Han
(74) *Attorney, Agent, or Firm* — Sughrue Mion, PLLC (57) ABSTRACT

An aircraft lamp includes a light source unit, a lamp housing that houses the light source unit, and a power supply control unit that has a casing and includes a control circuit structure configured to control light emission of the light source unit. The control circuit structure is housed in the casing. The casing is disposed outside the lamp housing.

6 Claims, 12 Drawing Sheets

(51) Int. Cl.
*F21V 5/04* (2006.01)
*F21V 23/00* (2015.01)

(56) References Cited

U.S. PATENT DOCUMENTS

| | | | |
|---|---|---|---|
| 9,068,723 B2 * | 6/2015 | Wilkinson | F21S 45/49 |
| 2005/0122727 A1 | 6/2005 | Machi et al. | |
| 2014/0119010 A1 | 5/2014 | Sawada et al. | |
| 2018/0334263 A1 | 11/2018 | Hessling-Von Heimendahl et al. | |

FOREIGN PATENT DOCUMENTS

| | | |
|---|---|---|
| JP | 2003-516273 A | 5/2003 |
| JP | 2007-513488 A | 5/2007 |
| JP | 2014-89868 A | 5/2014 |

OTHER PUBLICATIONS

International Written Opinion dated Mar. 17, 2020 issued by the International Searching Authority in counterpart International Application No. PCT/JP2020/002123 (PCT/ISA/237), No Translation.
Office Action dated May 9, 2023 by the Japan Patent Office in counterpart Japanese Patent Application No. 2019-008123, Computer-generated English translation.

* cited by examiner

AIRCRAFT LAMP

CROSS-REFERENCE TO RELATED APPLICATIONS

This application is a National Stage of International Application No. PCT/JP2020/002123 filed Jan. 22, 2020, claiming priority based on Japanese Patent Application No. 2019-008122, filed Jan. 22, 2019, and Japanese Patent Application No. 2019-008123, filed Jan. 22, 2019, the contents of all of which are incorporated herein by reference in their entirety.

TECHNICAL FIELD

The present disclosure relates to an aircraft lamp.

BACKGROUND ART

As a power supply of an aircraft lamp, a power generator mounted on the aircraft may be used. Since an AC current of the power generator is a high voltage, the high voltage AC current is stepped down to a voltage suitable for the aircraft lamp by using a power supply transformer for transformation.

In recent years, a lamp using a light emitting diode (LED) as a light source instead of an incandescent lamp as in Patent Literature 1 is proposed. In the lamp using an LED as a light source, in addition to the power supply transformer described above, a control circuit including a converter for rectifying an AC current into a DC current, a switching circuit for controlling turning on and turning off of the LED, and the like is required.

In addition, as aircraft lamps, there are an ice inspection lamp for illuminating a main wing or an engine of an aircraft to inspect ice adhering to the main wing or the engine, and a logo lamp for illuminating a logo mark of an aircraft company drawn on a vertical tail. An incandescent lamp is used for these lamps in related art, but in recent years, semiconductor light emitting elements such as LEDs are used as in Patent Literature 1. However, since an LED has a higher light condensing property than an incandescent lamp, it is not preferable to illuminate a wide region. In Patent Literature 1, in order to illuminate a required wide region, a reflector for diffusing light emitted from an LED is provided.

CITATION LIST

Patent Literature

Patent Literature 1: JP-A-2014-89868

SUMMARY OF INVENTION

Technical Problem

When a control circuit board constituting the control circuit is incorporated in a lamp housing together with the LED, vibration or impact generated in an airframe is transmitted to the control circuit board as it is, and thus the control circuit board is damaged. In addition, the control circuit board in this case is easily affected by an external environmental change such as an outside air temperature or an outside air pressure. In order to alleviate these effects, it is conceivable to incorporate the control circuit board together with a buffer member in the lamp housing. However, in order to implement such an interior structure, it is necessary to increase an inner volume of the lamp housing.

In general, in this type of lamp housing, a lamp body constituting the lamp housing is made of a metal material. When the inner volume of the lamp housing is increased, a high mechanical strength is required for the lamp housing, and thus it is necessary to use a thick metal material. It is difficult to perform so-called deep drawing in processing, particularly in press processing of the thick metal material. In the lamp housing of the related art, since it is inevitable to manufacture the lamp body by casting, it is difficult to manufacture the lamp body, the lamp housing, and the entire lamp in a small size and a light weight.

In addition, in the aircraft lamp in which the reflector is installed, a lamp housing having a shape and dimensions larger than those of the reflector is required, and thus the entire lamp becomes large. Since an ice inspection lamp or a logo lamp of the aircraft is disposed in a limited region of the airframe, the external dimensions of the lamp are often limited, and in such a case, it is difficult to apply the LED to a light source of the ice inspection lamp or the logo lamp.

A first object of the present disclosure is to provide a small and lightweight aircraft lamp using a semiconductor light emitting element as a light source.

A second object of the present disclosure is to provide a small and lightweight aircraft lamp that can emit light toward a wide region while using a semiconductor light emitting element as a light source and can be applied to an aircraft.

Solution to Problem

In order to achieve the first object, the present disclosure provides a lamp including: a light source unit; a lamp housing that houses the light source unit; and a power supply control unit that has a casing and includes a control circuit structure configured to control light emission of the light source unit, in which the control circuit structure is housed in the casing, and the casing is disposed outside the lamp housing.

In the present disclosure, it is preferable that the power supply control unit further includes a power supply transformer configured to transform power of a power supply for the light source unit, the power supply transformer is housed in the casing and is fixedly supported with respect to the casing, and the control circuit structure is movably supported with respect to the casing. For example, the casing is preferably formed in a container shape having an opening. In addition, it is preferable that the power supply transformer is embedded in a hard resin filled in the casing, and the control circuit structure is embedded in a soft resin filled in the casing.

It is preferable that the lamp housing of the present disclosure includes a lamp body having a container shape and subjected to press processing and an outer lens attached to the lamp body, and the casing of the power supply control unit is attached to the outside of the lamp body.

In order to achieve the second object, the present disclosure provides an aircraft lamp including: a light source unit; and a lamp housing that houses the light source unit. The light source unit includes a semiconductor light emitting element as a light source, and an inner lens configured to illuminate an airframe of an aircraft with light emitted from the light source. The inner lens includes a main lens configured to perform illumination with the light in a required direction, and a sub lens configured to perform illumination with the light in a direction different from the required direction. The main lens and the sub lens are integrally formed.

In the present disclosure, it is preferable that the light source includes a plurality of semiconductor light emitting elements, the semiconductor light emitting elements partially configured as a main light source, and the other semiconductor light emitting elements configured as a sub light source, the main lens is configured to perform illumination with light emitted from the main light source, and the sub lens is configured to perform illumination with light emitted from the sub light source.

In a preferred embodiment of the present disclosure, it is preferable that a plurality of main light sources and a plurality of main lenses are provided, and illumination light beams from the plurality of main lenses are directed in substantially the same direction. In addition, it is preferable that a plurality of sub light sources and a plurality of sub lenses are provided, and illumination light beams from respective sub lenses are directed in different directions. Further, it is preferable that the main lens is implemented by a lens that performs illumination with light in parallel or in a required angle range, and the sub lens is implemented by a lens that performs illumination in an angle range larger than the required angle range. For example, the main lens is a spherical or aspherical curved lens, and the sub lens is a prism.

Advantageous Effects of Invention

According to the present disclosure, it is possible to provide a small and lightweight aircraft lamp using a semiconductor light emitting element as a light source.

In addition, according to the present disclosure, it is possible to provide a small and lightweight aircraft lamp that can emit light toward a wide region using a semiconductor light emitting element as a light source and can be applied to an aircraft.

DESCRIPTION OF EMBODIMENTS

Figure 1:
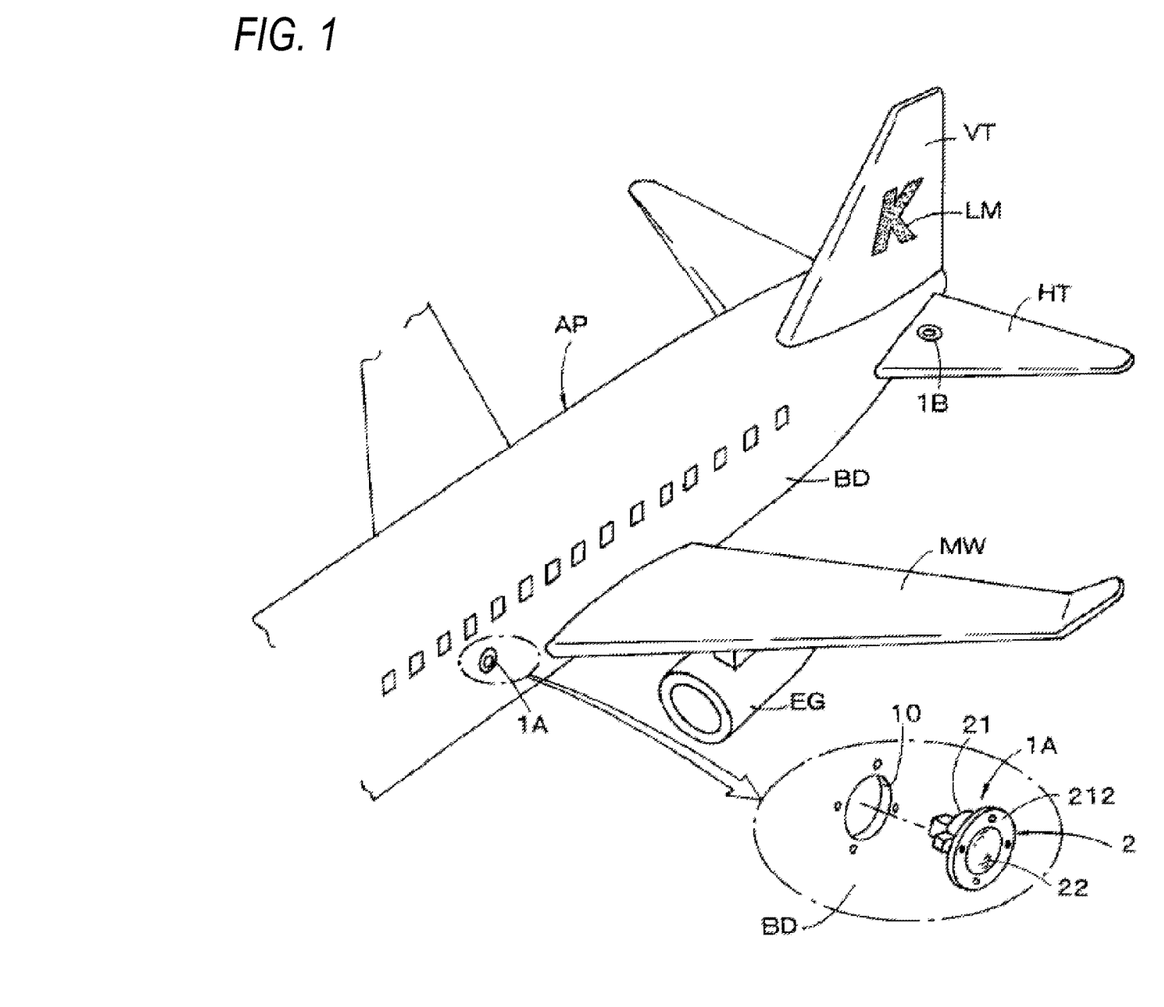
FIG. 1 is a schematic external view of an aircraft mounted with lamps according to the present disclosure.

Next, an embodiment of the present disclosure will be described with reference to the drawings. FIG. 1 is a schematic external view of an aircraft AP mounted with aircraft lamps according to the present disclosure. The aircraft AP includes, as the aircraft lamps according to the present disclosure, ice inspection lamps 1A that are disposed on left and right side surfaces of a body BD and perform illumination for inspecting ice adhering to left and right main wings MW and an engine EG, and logo lamps 1B that are disposed on left and right horizontal tails HT and illuminate logo marks LM of an airline company drawn on both side surfaces of a vertical tail VT. In the following description, the ice inspection lamp 1A and the logo lamp 1B on the left side of the aircraft AP will be described. The same ice inspection lamp and logo lamp are also disposed on the right side of the aircraft AP. The structures are the same as those of the ice inspection lamp 1A and the logo lamp 1B on the left side.

Figure 2A:
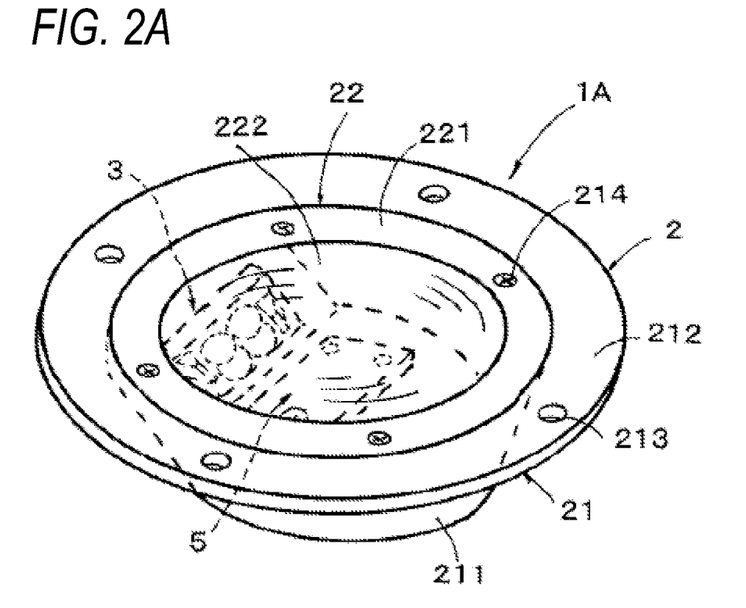
FIG. 2A is an external perspective view of an ice inspection lamp as viewed from a front surface side.
Figure 2B:
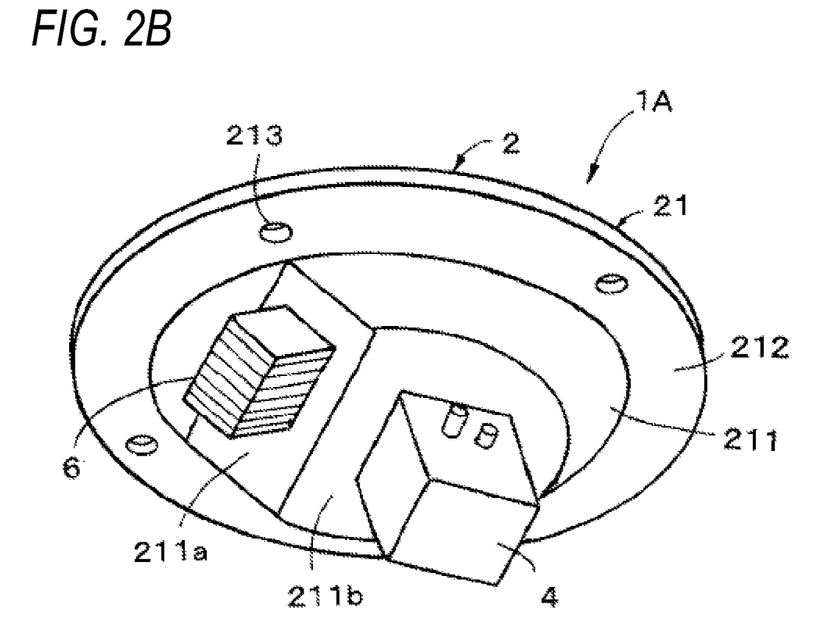
FIG. 2B is an external perspective view of the ice inspection lamp as viewed from a rear surface side.

FIG. 2A is an external perspective view of the ice inspection lamp 1A as viewed from a front surface side. FIG. 2B is an external perspective view of the ice inspection lamp 1A as viewed from a rear surface side. The ice inspection lamp 1A includes a lamp housing 2 which is formed in a disc shape having a substantially thick outer shape as a whole. The lamp housing 2 includes a lamp body 21 which is manufactured in a circular container shape having an open front surface, and an outer lens 22 which is disposed on a front surface side of the lamp body 21, that is, a side from which light is emitted.

The lamp body 21 is manufactured by pressing a metal material such as aluminum, and includes a main body 211 having a container shape, and a circular flange 212 integrally provided along a peripheral edge of the main body 211. As shown in FIG. 1, the ice inspection lamp 1A is attached to a circular hole 10 opened in the body BD of the aircraft AP by using the flange 212. The flange 212 is provided with an appropriate number of holes 213 for the attachment.

The outer lens 22 has an annular holder 221. A lens 222 made of a translucent resin plate such as a glass plate or PC (polycarbonate) is supported in the holder 221. The holder 221 is fixed to an inner edge portion of the flange 212 of the lamp body 21 by a screw or the like using an appropriate number of openings 214. Accordingly, the outer lens 22 seals the opening on the front surface of the lamp body 21, and the outer lens 22 and the lamp body 21 form a lamp chamber inside the lamp housing 2.

Figure 3:
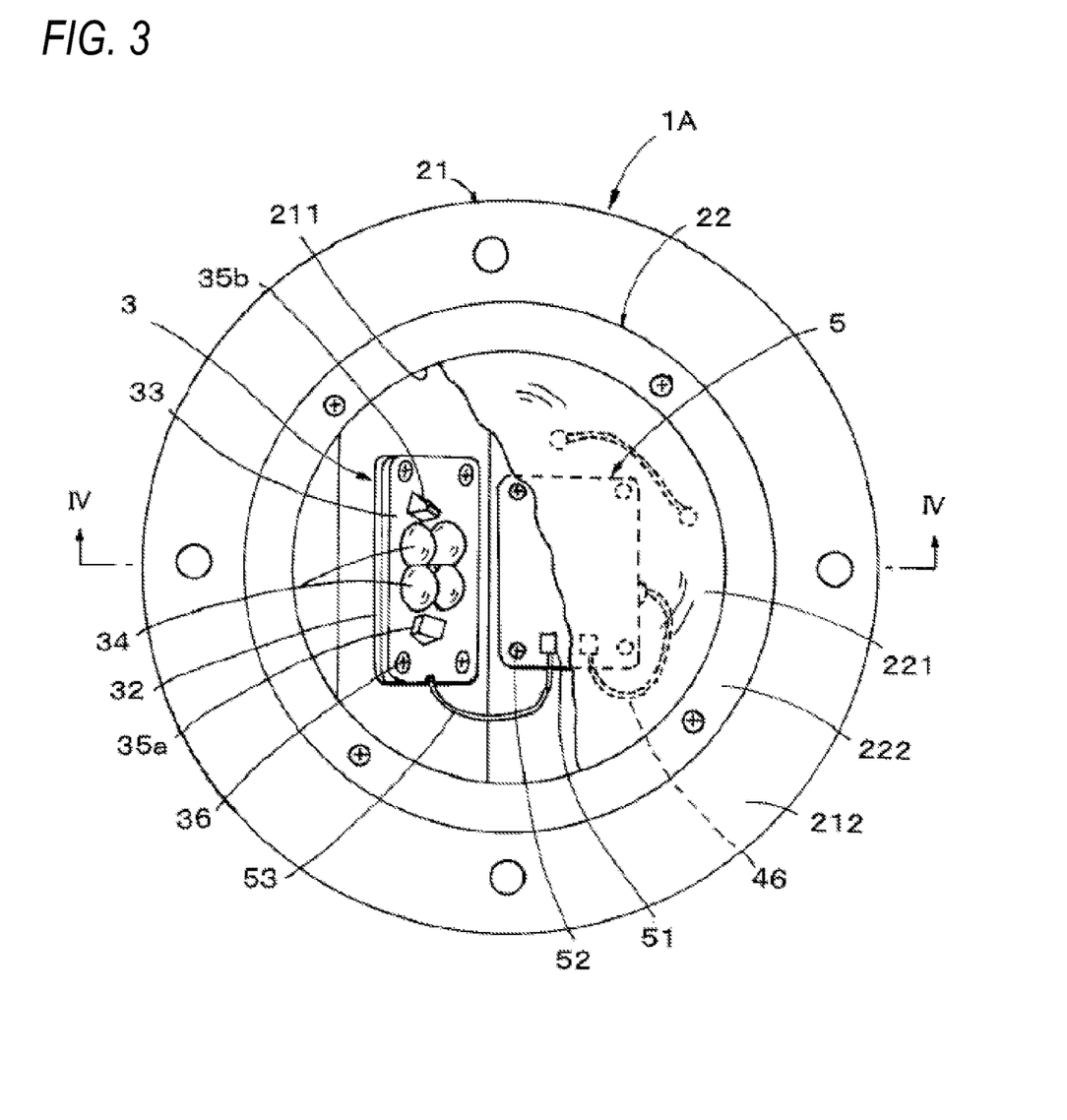
FIG. 3 is a view of the ice inspection lamp with a part broken as viewed from the front surface side.
Figure 4:
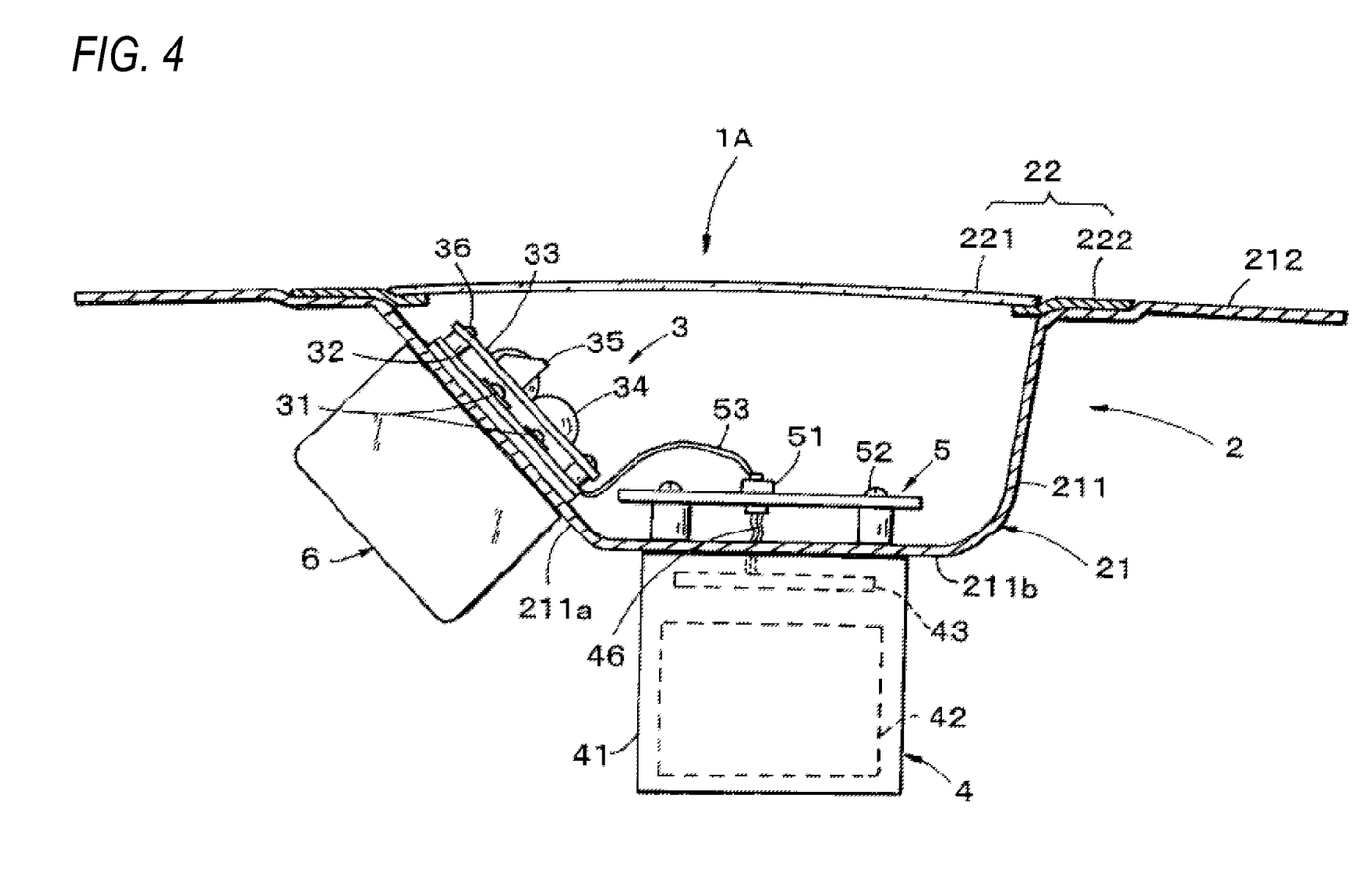
FIG. 4 is a cross sectional view taken along line IV-IV of FIG. 3.
Figure 5:
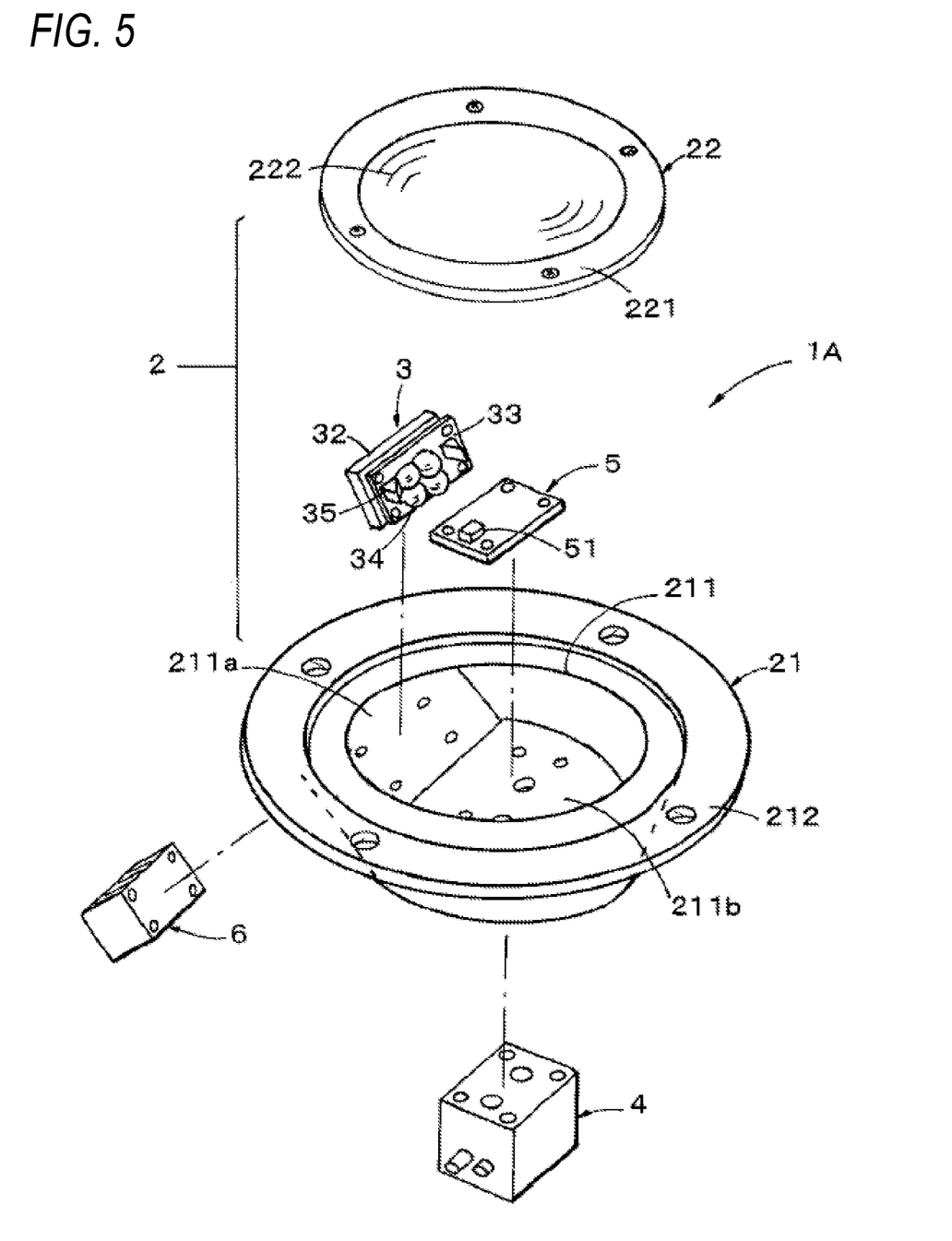
FIG. 5 is an exploded perspective view of a schematic part of the ice inspection lamp.

FIG. 3 is a view of the ice inspection lamp 1A with a part (outer lens 22) broken as viewed from the front surface side, and FIG. 4 is a cross sectional view taken along line IV-IV of FIG. 3. FIG. 5 is an exploded perspective view of a schematic part of the ice inspection lamp 1A. An LED (light emitting diode: semiconductor light emitting element) unit 3 that emits illumination light as an ice inspection lamp is installed in the lamp chamber of the lamp housing 2. That is, a part of a side surface of the main body 211 of the lamp body 21 constitutes a tapered surface 211a. The tapered surface 211a is a side surface that faces the front side of the aircraft AP when the ice inspection lamp 1A is attached to the aircraft AP, is a left side surface of the lamp body 21, and is a side surface inclined at a required angle with respect to the front surface of the lamp body 21. The LED unit 3 is supported on an inner surface of the tapered surface 211a. The LED unit 3 is an example of a light source unit.

Further, a relay terminal plate 5 is fixed to an inner surface of a bottom surface 211b of the lamp body 21 by a screw 52.

The LED unit 3 is electrically connected to a relay terminal 51 of the relay terminal plate 5 by a lead wire 53, and is further electrically connected to a lead wire 46 drawn out from a power supply control unit 4 to be described later with respect to the relay terminal plate 5. These electrical connections will be described later.

Figure 6:
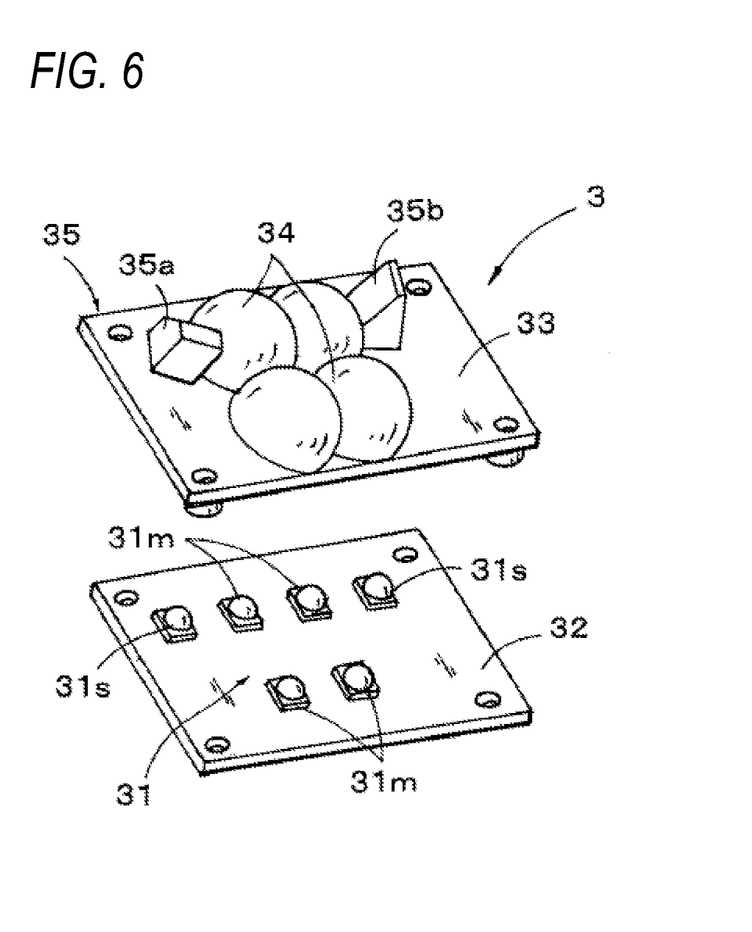
FIG. 6 is an exploded perspective view of an LED unit.
Figure 7:
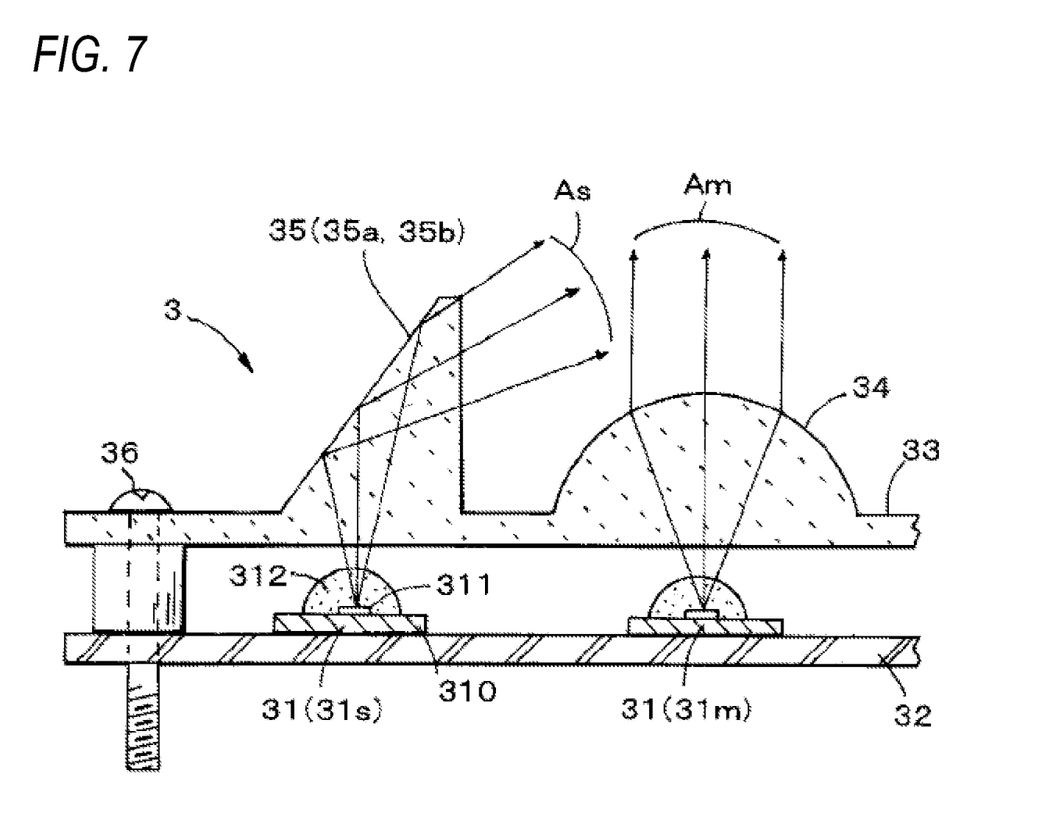
FIG. 7 is an enlarged cross sectional view of a part of the LED unit in an assembled state.

FIG. 6 is an exploded perspective view of the LED unit 3, and FIG. 7 is an enlarged cross sectional view of a part of the LED unit 3 in an assembled state. The LED unit 3 includes an LED substrate 32 on which a plurality of LEDs 31 are mounted, and an inner lens 33 integrally assembled to the LED substrate 32 in a stacked state. Each LED 31 is constituted by a white LED, and is mounted on an LED substrate 32 on which a required wiring circuit is formed so as to be arranged in a plane. The LED 31 constitutes a white LED in which a cover 312 containing a phosphor that emits yellow light is stacked on an LED chip 311 that is mounted on a base 310 and emits blue light or ultraviolet light.

In the present embodiment, six LEDs 31 are mounted on the LED substrate 32. A light emission axis of each LED 31 is oriented in a normal direction of a surface of the LED substrate 32. Among these LEDs 31, four LEDs near the center constitute a main LED 31m which is a main light source, and two LEDs among the LEDs 31 are arranged on both sides of the main LED 31m and constitute a sub LED 31s as a sub light source.

The inner lens 33 is formed in a substantially plate shape by molding a translucent resin such as PC, and is integrally connected to the LED substrate 32 in a stacked state by screws 36 at four corners of the inner lens 33. Six lenses 34 and 35 are integrally formed with the inner lens 33. In the present embodiment, these six lenses 34 and 35 include four main lenses 34 arranged to face the main LED 31m and two sub lenses 35 (35a and 35b) arranged to face the sub LED 31s.

These four main lenses 34 are each formed of curved lenses having the same shape. A curved surface of the curved lens is a spherical surface or an aspherical surface. In either case of the spherical surface or the aspherical surface, the main lens 34 emits light emitted from the main LED 31m toward an illumination region in a required angle range. In the present embodiment, the main lens 34 is configured to cause the light emitted from the main LED 31m to perform illumination substantially in parallel, or to cause the light to perform illumination substantially in the same direction as a luminous flux diverging within a range of a slightly larger angle. As a result, as schematically shown in FIG. 7, it is possible to brightly illuminate a distant illumination region Am although the illumination area is small.

The sub lens 35 is implemented by a prism. As shown in FIG. 7, the sub lens 35 emits the light emitted from the sub LED 31s in a wider angle range than the main lens 34 as a luminous flux diverging at a relatively large angle. The two sub lenses 35a and 35b have light reflecting surfaces of the prisms oriented in different directions, and emit the light emitted from the facing sub LED 31s toward an illumination region As different from the illumination region of the main lens 34. As a result, the illumination regions As of the two sub lenses 35a and 35b are combined, and a wide illumination region in the vicinity is brightly illuminated. The sub lenses 35a and 35b may be configured to emit light by refraction by the prism.

As described above, the LED unit 3 is attached to the inner surface of the tapered surface 211a of the lamp body 21 by a screw or the like. In this attached state, a light emitting surface of the LED unit 3 is inclined with respect to the front surface of the lamp body 21, that is, the front surface of the outer lens 22.

As shown in FIGS. 2A to 5, a heat sink 6 having a required shape is attached to an outer surface of the tapered surface 211a of the lamp body 21. In this case, the heat sink 6 may be attached by protruding a tip end of the screw 36 used for attaching the LED unit 3 to the lamp body 21 to the outside of the tapered surface 211a and using the screw 36. The heat sink 6 is thermally coupled to the LED substrate 32 of the LED unit 3. Heat generated when the LED unit 3 emits light is dissipated through the heat sink 6.

On the other hand, the power supply control unit 4 is attached to the outside of the lamp housing 2. In the present embodiment, the outside of the lamp housing 2 is an outer surface of the bottom surface 211b of the lamp body 21. As shown in the exploded perspective view of FIG. 8, the power supply control unit 4 includes a casing 41 having an opening and formed in a rectangular container shape. A power supply transformer 42 and a control circuit structure 43 are housed in the casing 41. The power supply transformer 42 is electrically connected to a power generator (not shown) mounted on the aircraft. The power supply transformer 42 is configured to step down a high voltage AC current from the power generator.

Figure 8:
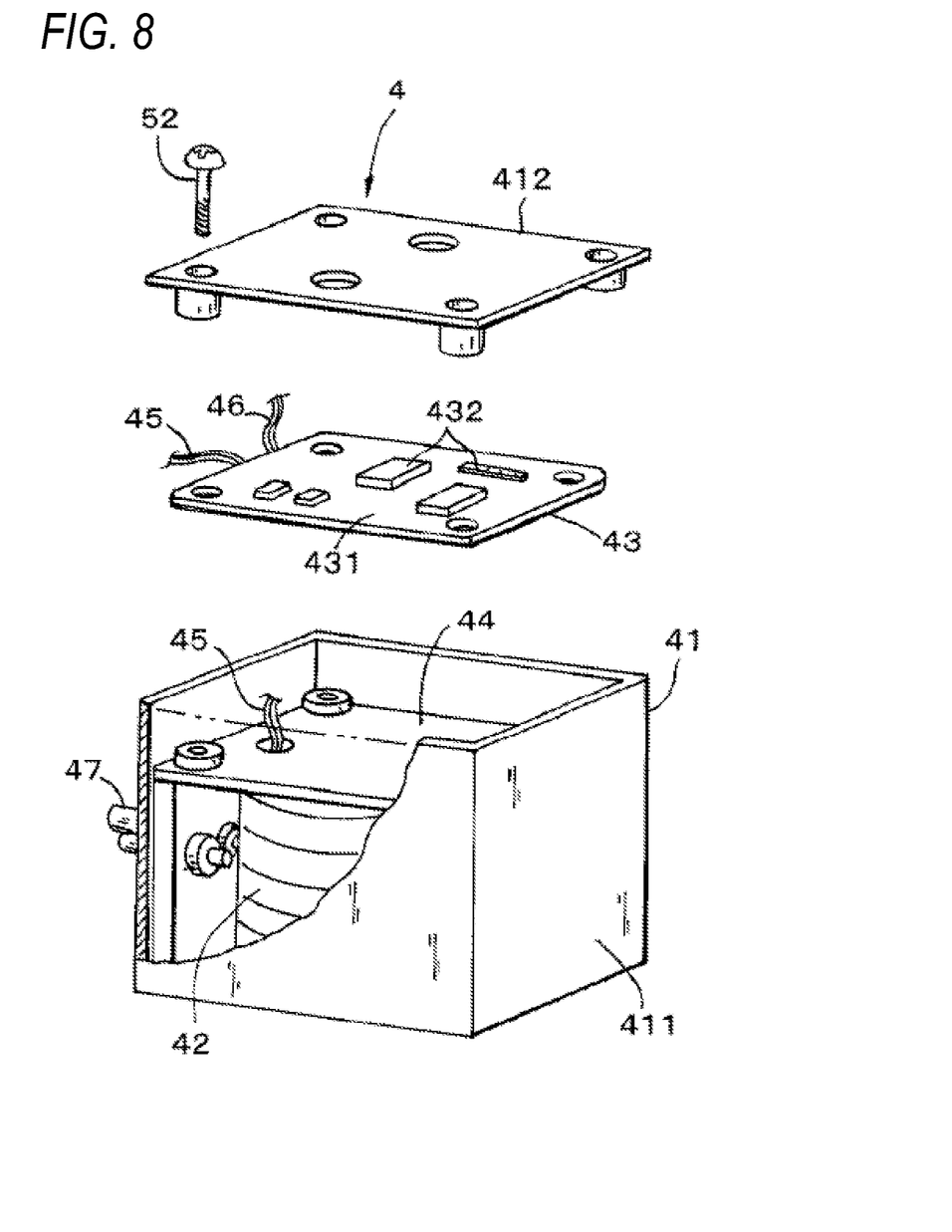
FIG. 8 is an exploded perspective view of a power supply control unit with a part broken.

The casing 41 includes a box body 411 formed in a rectangular container shape and having an opening, and a cover 412 covering the opening of the box body 411. The cover 412 covers the opening of the box body 411, so that the inside of the casing 41 is sealed. The box body 411 and the cover 412 are made of metal or resin having high mechanical strength.

Figure 9:
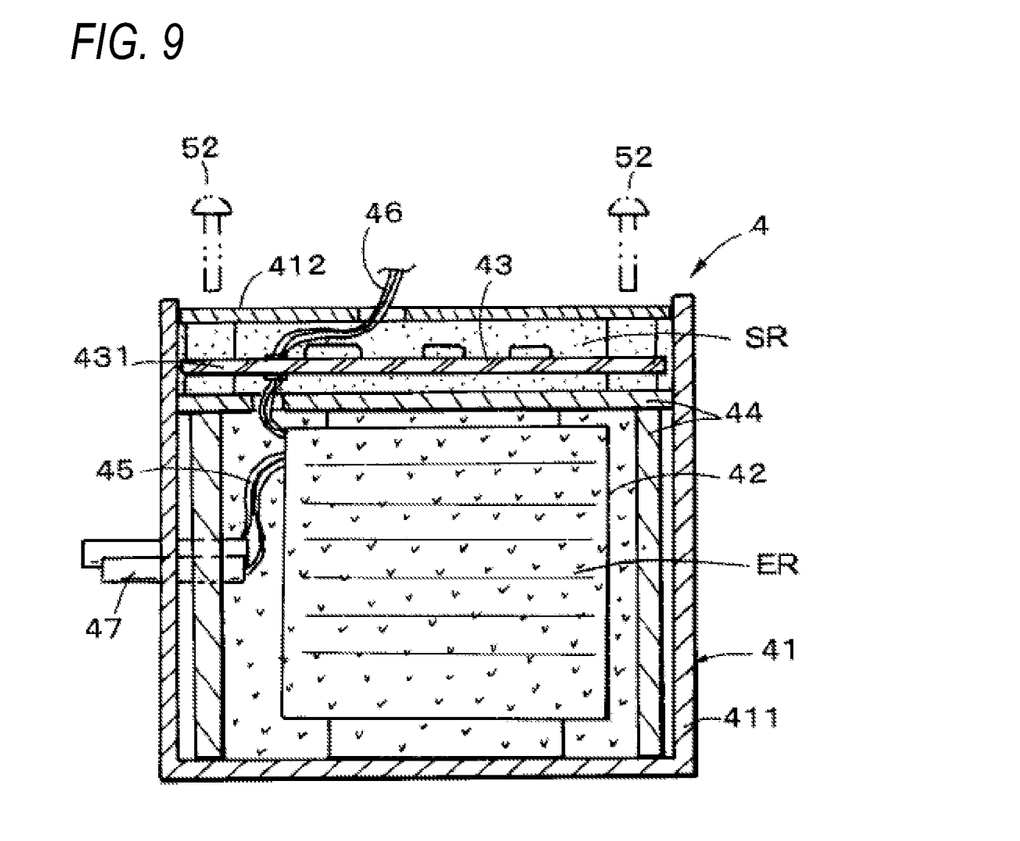
FIG. 9 is a longitudinal sectional view of the power supply control unit.

FIG. 9 is a longitudinal sectional view of the power supply control unit 4. The power supply transformer 42 is installed in a lower region of the box body 411, and is installed in a bottom portion of the casing 41. The power supply transformer 42 is used to step down a high voltage AC current generated by the power generator provided in the aircraft to a predetermined voltage. The predetermined voltage is a voltage suitable for controlling the light emission of the LED unit 3. The power supply transformer 42 includes a frame 44 integrated with a transformer yoke. When the frame 44 is coupled to the box body 411, the power supply transformer 42 is fixed inside the box body 411 and is fixedly supported with respect to the casing 41. In addition, the inside of the box body 411 is filled with hard resin shown by dotted v characters, that is, the epoxy resin ER in the present embodiment. The power supply transformer 42 is embedded in the epoxy resin ER in a sealed state using the epoxy resin ER.

The control circuit structure 43 is provided inside the box body 411 and in an upper region of the power supply transformer 42. Although detailed description is omitted, the control circuit structure 43 constitutes a control circuit board in which various electronic components 432 are mounted on a circuit board 431. A control circuit for controlling light emission of the LED 31 of the LED unit 3 is configured in the control circuit structure 43. The control circuit for controlling the light emission of the LED 31 is implemented by, for example, a rectifier circuit for rectifying an AC current stepped down by the power supply transformer 42 into a DC current, a DC-DC converter circuit for controlling the rectified DC current to a voltage suitable for the light emission of the LED 31, and a switch circuit for turning on and off a current supplied to the LED 31.

The control circuit structure 43 is placed on the frame 44 on the upper side of the power supply transformer 42, and the cover 412 is placed on the control circuit structure 43. In this way, the control circuit structure 43 is installed on an opening side of the casing 41. In addition, an upper region in the casing 41 sandwiched between the frame 44 and the cover 412 is filled with a soft resin shown by a plurality of random points, that is, a silicon resin (silicone resin) SR in the present embodiment. The control circuit structure 43 is embedded in the silicon resin SR in a sealed state using the silicon resin SR. Since the silicon resin SR is in a gel state, the control circuit structure 43 is not fixedly supported by the casing 41, but is in a state of being slightly movable with respect to the casing 41, and is supported so as to be relatively movable with respect to the casing 41. In other words, the control circuit structure 43 is supported in a floating state in the casing 41.

The power supply transformer 42 and the control circuit structure 43 are electrically connected to each other by a lead wire 45 inside the casing 41. The lead wire 46 for electrically connecting the control circuit structure 43 to the outside is drawn out from the casing 41 through a hole of the cover 412. Further, a power supply terminal 47 for electrically connecting the power supply transformer 42 to an external power supply is disposed on a side surface of the box body 411 of the casing 41.

A method of attaching the power supply control unit 4 to the bottom surface 211b of the lamp body 21 of the ice inspection lamp 1A will be described. The cover 412 is brought into contact with the bottom surface 211b of the lamp body 21. Next, a tip end of the screw 52 for fixing the relay terminal plate 5 is passed through the bottom surface 211b and is protruded to the outer surface of the bottom surface 211b. Further, a tip end of the screw 52 is passed through the cover 412 and the control circuit structure 43, and is screwed into a screw hole of the frame 44. The frame 44, that is, the box body 411 is coupled to the lamp body 21 by the screw 52. Accordingly, the power supply control unit 4 is attached to the lamp body 21 in a state where the control circuit structure 43 and the cover 412 are sandwiched between the box body 411 and the lamp body 21. Accordingly, the casing 41 is disposed outside the lamp housing 2. Further, the lead wire 46 connected to the control circuit structure 43 is passed through a hole of the bottom surface 211b to be connected to the relay terminal plate 5. As a result, the power supply control unit 4 and the LED unit 3 are electrically connected to each other.

By attaching and electrically connecting the power supply control unit 4 in this manner, power controlled by the power supply control unit 4 is supplied to the LED unit 3, and the light emission of the LED 31 is controlled. When the LED unit 3 emits light, an illumination direction of the light emitted from the LED 31 is controlled by the inner lens 33, and the light passes through the outer lens 22 and is emitted to the outside of the ice inspection lamp 1A toward the airframe of the aircraft AP.

As shown in FIG. 1, the ice inspection lamp 1A is attached to the body BD at a position slightly forward and upward of the main wing MW. The LED unit 3 is attached in a state of being inclined with respect to a front surface of the ice inspection lamp 1A in the lamp housing 2. Therefore, by appropriately adjusting an attachment posture of the ice inspection lamp 1A, the light emitting surface of the LED unit 3 is attached to the body BD in a state of being slightly directed downward and rearward with respect to the aircraft AP.

In response to power from the power generator, the power supply control unit 4 controls the light emission of the LED unit 3. When the LED unit 3 is turned on for ice detection by automatic control or by an operation of an operator, the main wing MW and the engine EG are illuminated by the ice inspection lamp 1A.

Figure 10:
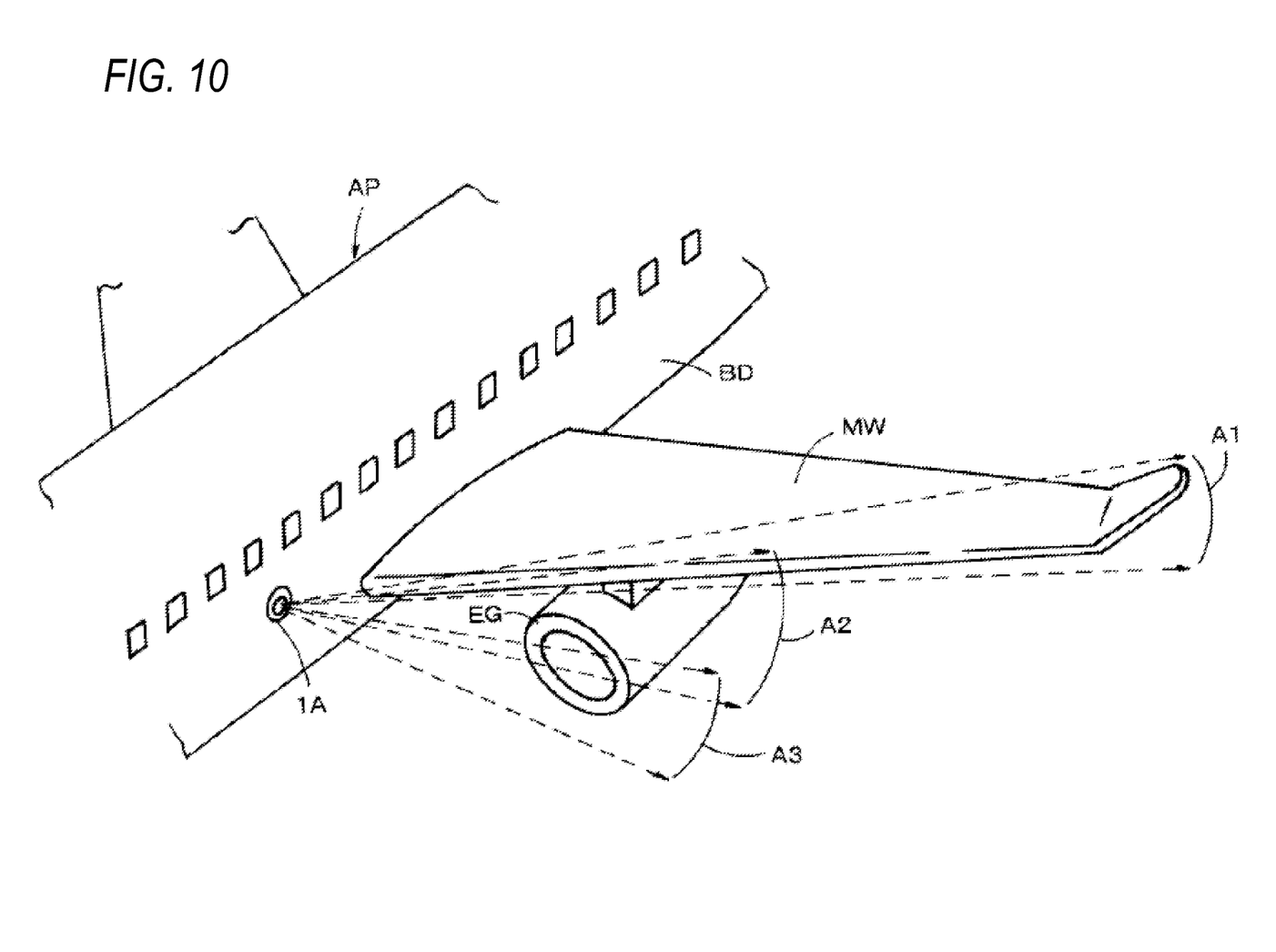
FIG. 10 is a schematic perspective view for illustrating an illumination region of the ice inspection lamp.

FIG. 10 is a view showing an illumination region of the left ice inspection lamp 1A. The light emitted from the four main LEDs 31m in the LED unit 3 is directed in substantially the same direction by the main lens 34, and the light is combined and emitted toward a tip end of the main wing MW to illuminate a region A1. As a result, the ice inspection lamp 1A illuminates a region ranging from a base end portion (a portion close to the body BD) in the vicinity of the main wing MW to a front portion far away, and illuminates the entire region along a leading edge portion of the main wing MW, which is particularly prone to icing.

On the other hand, the light emitted from the two sub LEDs 31s illuminates, by the sub lenses 35a and 35b, a region ranging from the base end portion of the main wing MW to the engine EG, which is different from the illumination region by the main LED 31m. Since the orientations of the prisms constituting the sub lenses 35a and 35b are different from each other, the regions illuminated by the sub lenses 35a and 35b are also different from each other. In the present embodiment, the sub lens 35a on a lower side (the left side in FIG. 6) illuminates a region A2 including an upper portion of the engine EG from the vicinity of the base end portion of the main wing MW, and the sub lens 35b disposed on an upper side (the right side in FIG. 6) illuminates a region A3 including a lower portion of the engine EG.

Therefore, when the ice inspection lamp 1A is turned on, a combined region of the illumination by the main LEDs 31m and the illumination regions A1 to A3 by the sub LEDs 31s is illuminated. With this illumination, substantially the entire region of the main wing MW and the engine EG can be suitably illuminated as in the case of an ice inspection lamp using an incandescent lamp as a light source, and the leading edge regions of the main wing MW and the engine EG, which are particularly prone to icing, can be suitably illuminated.

Therefore, the ice inspection lamp constituted by the existing incandescent lamp can be replaced with the ice inspection lamp 1A according to this embodiment using an LED as a light source. In addition, since the LED unit 3 does not include a parabolic or elliptical reflector as in Patent Literature 1, the ice inspection lamp 1A can be manufactured to be small and light in weight, and the ice inspection lamp 1A can be applied to an aircraft.

Further, in the ice inspection lamp 1A according to the present embodiment, the control circuit structure 43 is integrally formed with the power supply transformer 42 as the power supply control unit 4, and is attached to the outside of the lamp housing 2 so as to control the light emission of the LED unit 3 in the lamp housing 2. Therefore, it is not necessary to dispose the control circuit structure 43 inside the lamp housing 2, and the internal volume required for the lamp housing 2 can be reduced. In addition, since it is not necessary to route the wiring connected to the control circuit structure 43, in particular, the wiring for electrically connecting the power supply transformer 42 and the control circuit structure 43 in the lamp housing 2, it is possible to reduce the inner volume of the lamp housing 2. Accordingly, the lamp housing 2 can be configured to be small, and the entire ice inspection lamp 1A can be downsized.

Further, as the lamp housing 2 is reduced in size, the mechanical strength required for the lamp body 21 can be reduced. Therefore, it is possible to manufacture the lamp body 21 by using a metal material having a reduced plate thickness, and it is possible to easily perform pressing of processing the lamp body 21 into a container shape, and as a result, weight reduction of the lamp housing 2 or the ice inspection lamp 1A can be implemented.

In the power supply control unit 4, since the power supply transformer 42 housed in the casing 41 is sealed with the curable epoxy resin ER, when the casing 41 is vibrated by vibration or impact of the aircraft AP, it is possible to prevent the heavy and inertial power supply transformer 42 from moving in the casing 41 and colliding with an inner surface of the casing 41. In addition, the epoxy resin ER can enhance the insulation property of the power supply transformer 42 from the external environment. As a result, an explosion-proof effect of the power supply transformer 42 caused by the impact in the casing 41 is obtained.

Further, in the power supply control unit 4, since the control circuit structure 43 is sealed with the gelled silicon resin SR, the control circuit structure 43 is supported in a floating state in the casing 41. Therefore, even if the casing 41 is vibrated due to the vibration of the aircraft, the vibration is absorbed by the silicon resin SR and is not transmitted to the control circuit structure 43, and the control circuit structure 43 is prevented from being physically damaged. At the same time, wirings 45, 46, and 53 connecting the control circuit structure 43 and the power supply transformer 42 are also prevented from being damaged by vibration.

In particular, since the ice inspection lamp 1A is exposed to the outside of the aircraft AP, the control circuit structure 43 and the wirings 45, 46, and 53 are easily damaged by the influence of the external environment, for example, atmospheric pressure change, temperature change, natural phenomena such as wind and rain, and lightning, or is easily affected in the reliability of operation. By disposing the control circuit structure 43 in a sealed state in the casing 41 of the power supply control unit 4 attached to the bottom surface side of the lamp housing 2, it is possible to alleviate the influence of the external environment and to enhance the reliability of the ice inspection lamp.

The above embodiment is an example in which the present disclosure is applied to an ice inspection lamp, but as described above, the lamp according to the present disclosure can also be applied to the logo lamp 1B shown in FIG. 1. As shown in FIG. 1, the logo lamp 1B is disposed at a part of the upper surface of the left and right horizontal tails HT, in particular, at a position so as to look up at both left and right side surfaces of the vertical tail VT on which the logo mark LM is drawn. Although not shown in detail, a substantially circular recessed portion is provided at the position on the upper surface of the horizontal tail HT, and the logo lamp 1B is fixed to the horizontal tail HT so as to be accommodated in the recessed portion.

Figure 11:
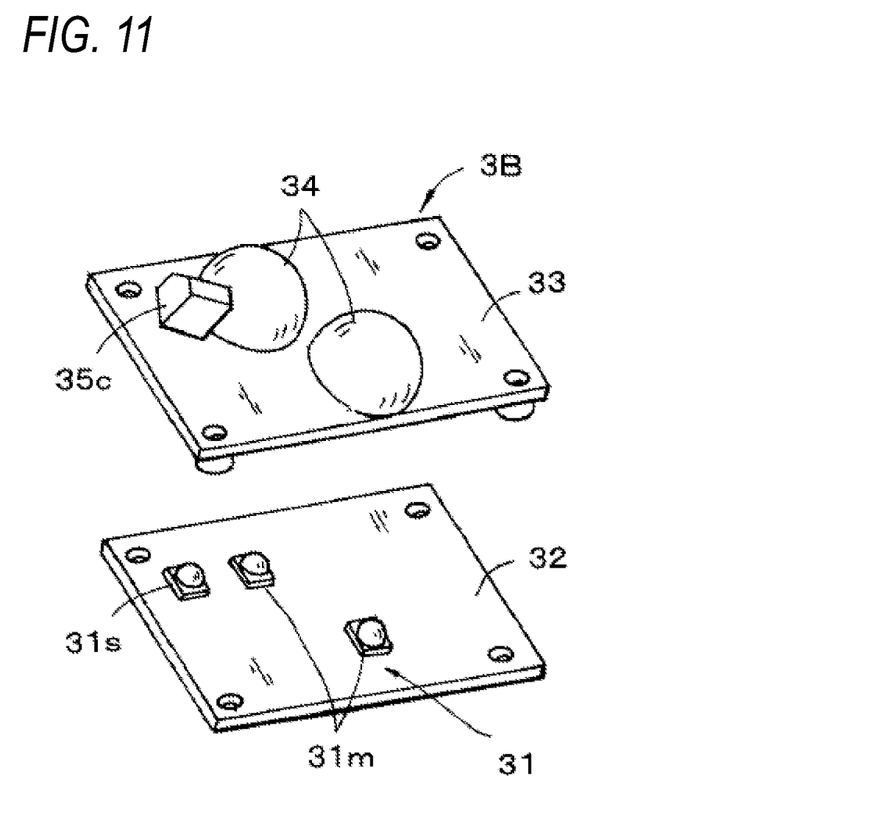
FIG. 11 is an exploded perspective view of an LED unit of a logo lamp.

The basic configuration of the logo lamp 1B is the same as that of the ice inspection lamp 1A, but a part of the configuration of the LED unit is different. FIG. 11 is an exploded perspective view of an LED unit 3B of the logo lamp 1B. Portions of the ice inspection lamp 1A equivalent to those of the LED unit 3 are denoted by the same reference numerals, and redundant description thereof will be omitted.

The LED unit 3B includes an LED substrate 32 and an inner lens 33. The configuration in which an emission direction of the light emitted by the LED 31 mounted on the LED substrate 32 is controlled by the inner lens 33 is the same as that of the LED unit 3.

In the LED unit 3B of the logo lamp 1B, two main LEDs 31m and one sub LED 31s are mounted as the LEDs 31 on the LED substrate 32. Two main lenses 34 and one sub lens 35c are formed in the inner lens 33 so as to correspond to the LEDs. The main lens 34 is formed of a spherical or aspherical curved lens, and the sub lens 35c is formed of a prism.

In the logo lamp 1B, although not shown, the LED unit 3B is also incorporated in the lamp housing similarly to the above-described ice inspection lamp 1A. Further, the power supply control unit is also attached to the lamp housing similarly to the ice inspection lamp 1A. Similarly to the ice inspection lamp 1A, the power supply transformer and the control circuit board are disposed in the power supply control unit in a state of being sealed with different resins (hard resin and soft resin). That is, the logo lamp 1B is configured by replacing the LED unit 3 of the ice inspection lamp 1A with the LED unit 3B.

Figure 12:
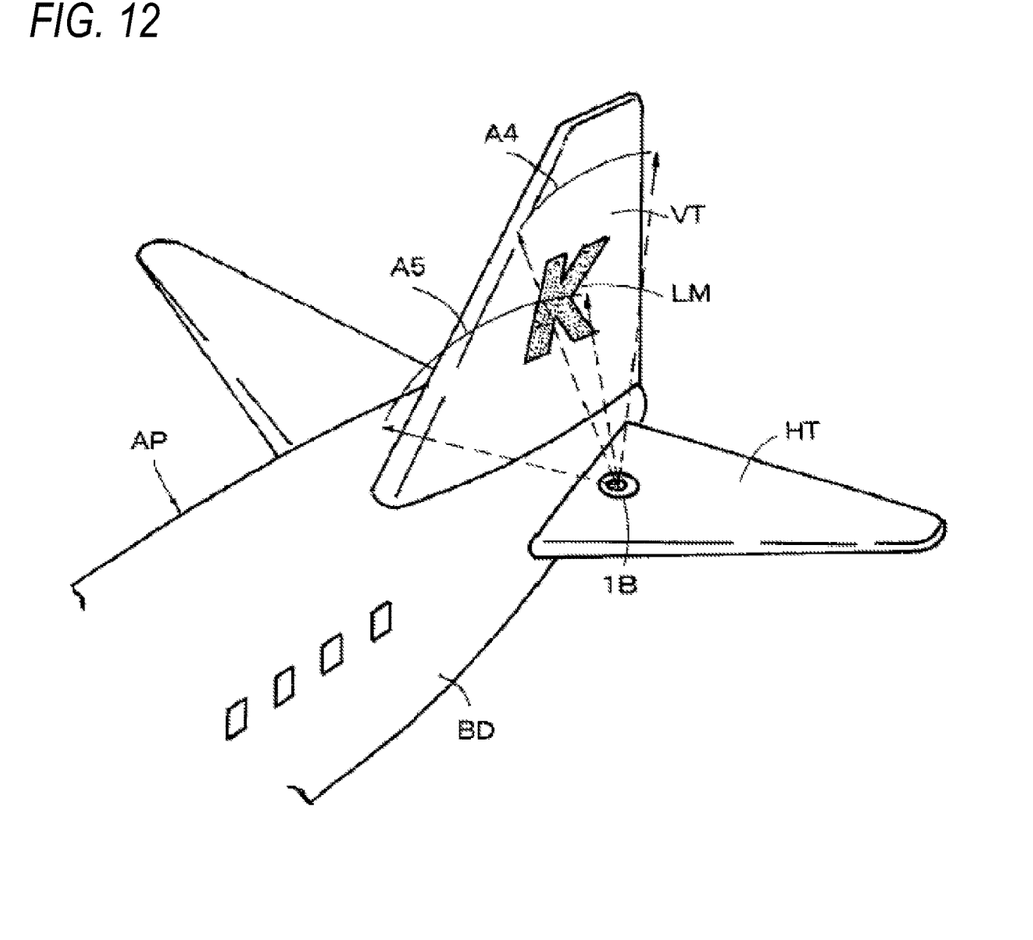
FIG. 12 is a schematic perspective view for illustrating an illumination region of the logo lamp.

FIG. 12 is a diagram showing an illumination region of the logo lamp 1B disposed on the left side of the aircraft AP shown in FIG. 1. In the LED unit 3B, light emitted from two main LEDs 31m is directed in substantially the same direction by the main lens 34, and the light is combined and emitted toward a tip end of the vertical tail VT to illuminate a region A4. Therefore, a region from a lower end portion to an upper end portion of the vertical tail VT, that is, a region in which the logo mark LM is drawn is illuminated.

On the other hand, the light emitted from the sub LED 31s is refracted by the sub lens 35c, and illuminates a region A5 in the vicinity of a base end portion of the vertical tail VT, which is different from the illumination region by the main LED 31m. As a result, when the logo lamp 1B is turned on, a combined region of the illumination by the main LED 31m and the illumination regions A4 and A5 by the sub LED 31s is illuminated, and similarly to a logo lamp using an incandescent lamp as a light source, substantially the entire region of the vertical tail VT can be illuminated, and the logo mark LM can be suitably illuminated.

As described above, in the logo lamp 1B, the LED unit 3B can illuminate a wide region similar to that of an incandescent lamp. Therefore, the logo lamp constituted by the existing incandescent lamp can be replaced with the logo lamp 1B constituted by the LED unit 3B. In addition, since the LED unit 3B does not include a reflector, the LED unit 3B can be manufactured to be small and light in weight, and the LED 31 can be applied to an aircraft.

In addition, in the logo lamp 1B, the power supply control unit is disposed outside the lamp housing, and the power supply transformer and the control circuit board are incorporated in the power supply control unit. With this configuration, reliability against vibration and external impact of the aircraft AP is enhanced, and at the same time, the lamp body 21 can be downsized. Therefore, the logo lamp 1B can be reduced in size and weight, and the LED 31 can be applied to the aircraft AP.

In the ice inspection lamp and the logo lamp described above, the main lens of the outer lens of the LED unit is formed of a curved lens, and the sub lens is formed of a prism, but the form of these lenses can be changed as appropriate. That is, the main lens may have any shape as long as the main lens emits a luminous flux suitable for illuminating a distant area, and the sub lens may have any shape as long as the sub lens emits a luminous flux suitable for illuminating a wide region in the vicinity.

In addition, the number of LEDs constituting the LED unit and the number of lenses of the inner lens can be appropriately adjusted according to an area of a portion to be illuminated of the aircraft and a distance to the portion.

The power supply control unit may include other components in addition to the power supply transformer and the control circuit board, and even in such a case, these other components may be integrally housed in the casing. In this case, if the other component is a component resistant to vibration, the other component may be embedded in the hard resin integrally with the power supply transformer, and if the other component is a component that preferably avoids vibration, the other component may be embedded in the soft resin integrally with the control circuit board.

The hard resin or the soft resin for embedding and supporting the power supply transformer and the control circuit board is not limited to the epoxy resin or the silicon resin described in the embodiment, and other resins can also be applied.

The invention claimed is:

1. An aircraft lamp comprising:
a light source unit;
a lamp housing that houses the light source unit; and
a power supply control unit that has a casing and includes a control circuit structure configured to control light emission of the light source unit,
wherein the control circuit structure is housed in the casing and movably supported with respect to the casing,
wherein the casing is disposed outside the lamp housing,
wherein the power supply control unit further includes a power supply transformer configured to transform power of a power supply for the light source unit, and
wherein the power supply transformer is housed in the casing and is fixedly supported with respect to the casing.

2. The aircraft lamp according to claim 1,
wherein the power supply transformer is embedded in a hard resin filled in the casing, and
wherein the control circuit structure is embedded in a soft resin filled in the casing.

3. The aircraft lamp according to claim 2,
wherein the casing is formed in a container shape having an opening,
wherein the power supply transformer is housed on a bottom portion of the casing facing the opening, and
wherein the control circuit structure is housed in the casing on an opening side.

4. The aircraft lamp according to claim 2,
wherein the hard resin is an epoxy resin, and
wherein the soft resin is a silicone resin.

5. The aircraft lamp according to claim 1,
wherein the lamp housing includes a lamp body having a container shape and subjected to press processing, and an outer lens attached to the lamp body, and
wherein the casing of the power supply control unit is attached to the outside of the lamp body.

6. The aircraft lamp according to claim 1,
wherein the aircraft lamp is configured as an ice inspection lamp or a logo lamp of an aircraft.

* * * * *